United States Patent [19]

Ulvestad

[11] 4,160,408
[45] Jul. 10, 1979

[54] APPARATUS FOR TREATMENT OF PUMPABLE MATERIALS

[76] Inventor: Ole P. Ulvestad, Nyheimsveien 45, N-7058 Jakobsli, Norway

[21] Appl. No.: 740,935

[22] Filed: Dec. 1, 1976

[51] Int. Cl.² .......................................... A47J 37/00
[52] U.S. Cl. ...................................... 99/348; 99/352
[58] Field of Search .......................... 99/371, 483–484, 99/485–486, 348, 352; 366/167, 174–175, 184, 220–221, 225, 230–231; 165/92

[56] References Cited

U.S. PATENT DOCUMENTS

| | | | |
|---|---|---|---|
| 302,879 | 7/1884 | Wood et al. | 366/230 |
| 422,260 | 2/1890 | Stephens | 165/92 |
| 1,696,048 | 12/1928 | McCormick et al. | 366/220 |

Primary Examiner—Harvey C. Hornsby
Assistant Examiner—Arthur O. Henderson

[57] ABSTRACT

Apparatus for treatment of pumpable materials, such as foodstuffs and fodder, which includes a container of cylindrical form for subjecting bulk material to at least a pressure and/or heat treatment. The container is provided with at least one axially mounted, radial wall disposed sealingly against side and end walls thereof. The radial wall has a shaft adapted for the supply and removal of the material on opposite sides of the wall. The radial wall and the container are rotatable relative to each other so that particles or individual portions of the material remain substantially at rest relative to the container wall during the treatment.

6 Claims, 4 Drawing Figures

APPARATUS FOR TREATMENT OF PUMPABLE MATERIALS

BACKGROUND OF INVENTION

Field of Invention

This invention relates to apparatus for the treatment of pumpable materials, especially foodstuffs and fodder, under predetermined conditions of pressure and/or temperature.

Conventional apparatus for this purpose have either been designed for batch operation or they have given rise to large differences in treatment time for dissimilar portions of the bulk material.

Summary of the Invention

The main object of the invention is thus to make possible a wholly continuous operation and uniform treatment conditions for all portions of the bulk material which is to be treated.

According to the present invention an apparatus for the treatment of pumpable materials, such as foodstuffs and fodder, comprises a cylindrical container in which the bulk material is to be subjected to at least a pressure and/or heat treatment, said container being provided with at least one axially mounted, radial wall disposed closely against side and end walls thereof and said radial wall having a shaft adapted for the supply and removal of said material on opposite sides of said wall, said wall and said container being rotatable relative to each other enabling components of said material to remain substantially at rest relative to said wall during the treatment.

BRIEF DESCRIPTION OF THE DRAWINGS

In order that the invention can be more clearly understood, a convenient embodiment thereof will now be described, by way of example, with reference to the accompanying drawings in which.

DESCRIPTION OF CONVENIENT EMBODIMENT

Figure 1:
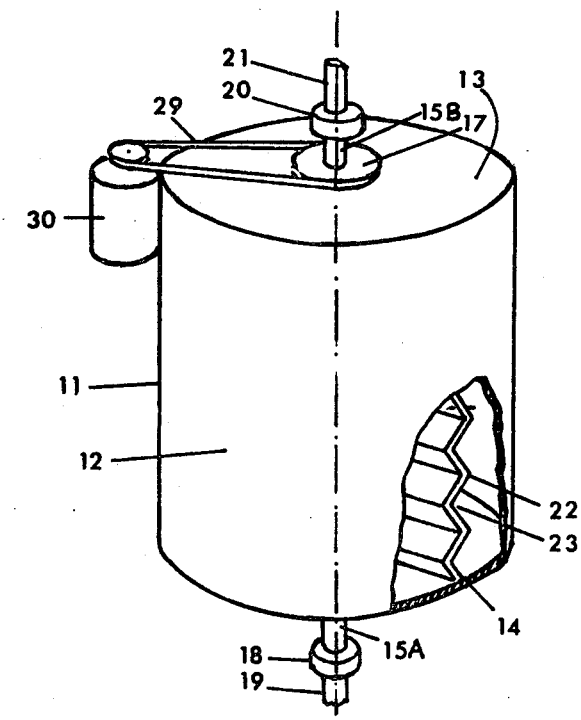
FIG. 1 is a perspective view, with a cut-out portion, of an apparatus according to the invention.

Referring to the drawings, an apparatus comprises a container 11 having a circular, cylindrical side wall 12 which is closed by end walls 13. Mounted axially in the container 11 is a rotatable radial wall or rotor 14 which extends radially outwards towards the side wall 12 and bears against the latter and the end walls 13. Edges of the radial wall 14 can, if desired, be provided with a sealing means which ensures tight abutment and prevents a flow through from one side to the other.

Figure 2:
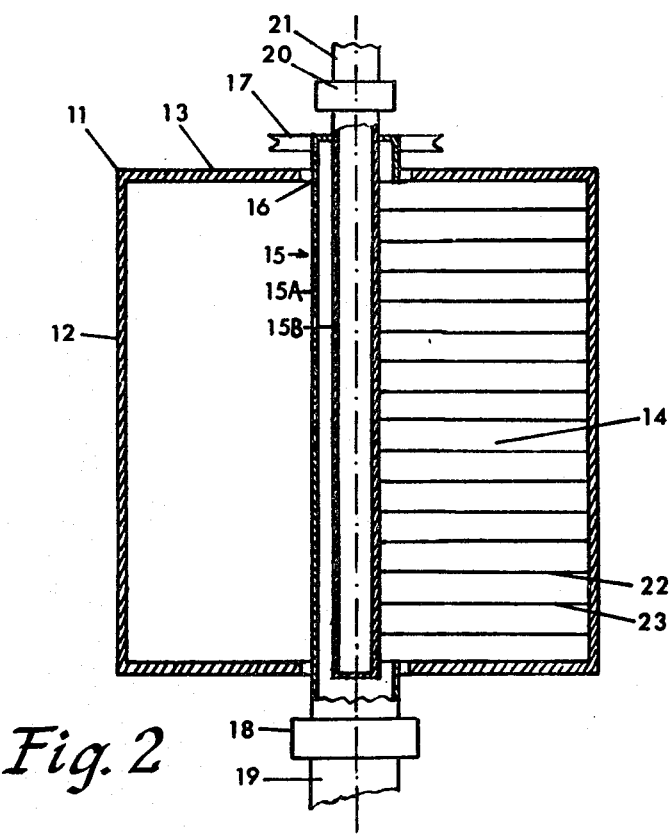
FIGS. 2 and 3 are, respectively, axial and radial sections through the container in the apparatus of FIG. 1.

The radial wall 14 is mounted on a shaft 15 which generally comprises two concentric pipes, namely an outer pipe 15A and an inner, central pipe 15B. The outer pipe 15A is mounted in appropriately sealed bearings 16 in the end walls 13. In addition, it is led out through the upper end wall (see FIG. 2), where it supports a belt drive 17, and at the lower end wall where by means of an appropriate slip coupling 18, it is connected to a pipe 19 which can serve as an outlet pipe. The central pipe 15B is led out in a corresponding manner from the outer pipe 15A at the upper side of the container 11 (see FIG. 2) and with a slip coupling 20 is connected to a pipe 21 which can serve as an inlet pipe. The connections of pipes 15A and 15B with the interior of the container 11 are described below.

Figure 4:
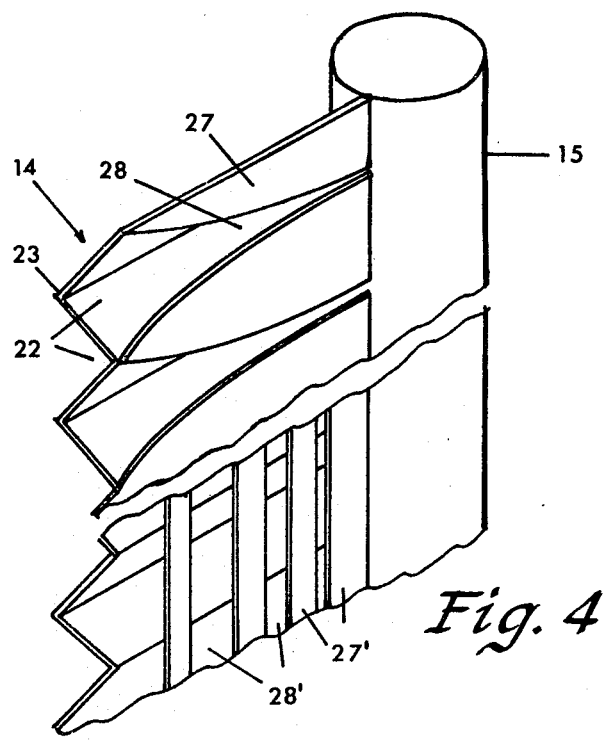
FIG. 4 is a partially cut-off perspective view of a part of the rotor of FIGS. 2 and 3.

As is evident, especially from FIG. 4, the radial wall 14 is made with a wave structure or corrugations in a radial direction with alternate chutes 22 and ribs 23 which extend into the shaft 15. In this particular embodiment, the radial wall 14 is produced as a single layer and the ribs on the one side will therefore form chutes on the other. On the other side of the radial wall 14, there is present an opening 24 in the outer pipe 15A which empties into the bottom of each chute 22 on this side. Correspondingly, there are present on the opposite side openings 25 in the central pipe 15B out into the bottom of the chutes 22 on this side. The hollow space between the central pipe 15B and the outer pipe 15A is sealed against this side of the radial wall by means of an axially and radially extending wall 26 which connects the two pipes, the radial wall being led into and anchored in the central pipe 15B. The chutes 22 on this side are, in addition, covered with a screen or partition 27 so that there is formed an outlet slot 28 having an increasing breadth outwards from the central pipe 15B. It is appropriate to dimension this outlet slot so that its breadth is proportional to the square of the distance from the axis.

At the bottom of FIG. 4, there is shown a screen or partition 27' which leaves behind radially extending slots 28' which increase in density and/or breadth outwards from the centre. This slot formation can also be dimensioned so that proportionality is achieved between the opening area and the square of the distance from the axis.

The belt disc 17 at the upper side of the container 11 is connected via a drive belt 29 to a motor 30.

Figure 3:
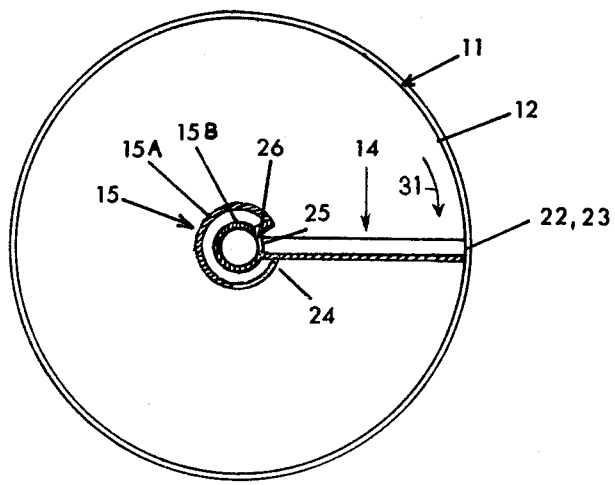

Besides that which is illustrated, the container can be provided with equipment for heating, supply of additional material, pressure and temperature measurement etc. The mode of operation of this apparatus is as follows:

There is fed a predetermined quantity of material, such as fodder which is to be heat- and pressure-treated, through the supply pipe 21. Such material will in actual circumstances, e.g. with ground slaughter house waste, be sufficiently fluid to be pumpable. The withdrawal of the material will be brought about and controlled by rotation of the radial wall in the direction of the arrow 31 (see FIG. 3). The speed of the radial wall 14 is adjusted so that a revolution corresponds to the retention time of the raw material. For example, an apparatus with a capacity of 1m$^3$/h raw material for a retention time of thirty minutes will be able to have a volume of 0.5m$^3$ and the speed of the radial wall will be 2 revs./h. The duration of the material in the container 11 is thus equal to the time of revolution of the radial wall which is fixed by the speed of rotation of the motor 30 and the gear ratio of the power transmission. The pressure in the material will be able to be controlled by means of a valve in the outlet conduit.

The consistency of the material will in most instances, where it is necessary, be able to be adjusted by the addition or extraction of fluid so that the desired operative conditions are achieved.

The apparatus which is described above can be modified in a number of ways, firstly with respect to the design of the radial wall. Instead of the illustrated corrugated form, it can be constructed with several planer layers. The qualification is that the radial wall be designed so that all particles of material after feeding to the container remain at rest in the container, that is to say no flow of the material occurs.

Furthermore, it is possible to vary the proportions of the container and the radial wall. It is especially useful to make the diameter of the outer pipe 15B larger primarily in those cases where there is a strong demand for uniform treatment.

In an alternative embodiment, the supply and withdrawal of the material can occur from the same end of the container. The container can also be provided with more than one radial wall, but the supply and withdrawal of the material will then be more difficult.

Such an apparatus can be utilised for a number of purposes in the treatment of foodstuffs and fodder. It is especially appropriate to employ it as a holding cell, for example in pasteurisation and sterilisation of food products.

It should be appreciated that a number of modifications can be made to the embodiment described above. For example, it is possible to arrange the container with a horizontal axis and to maintain the radial wall at rest while the container is rotated.

The invention is primarily designed for foodstuffs and fodder. However, it can be used for a series of other materials which can be made pumpable and which can be maintained under predetermined conditions for a certain time, for example at a predetermined pressure, temperature, pH value or enzymatic condition. With the assistance of means which rotate with the radial wall, certain of these conditions, such as temperature and pH value, can be varied during the course of the time of treatment.

I claim:

1. Apparatus for the treatment of pumpable materials, such as foodstuffs and fodder, which comprises a cylindrical container in which the bulk material is to be subjected to at least a treatment selected from at least one of pressure and heat, said container having side and end walls and an axially mounted, radial wall disposed closely against said side and end walls, said radial wall having a shaft having the supply and removal of said material on opposite sides of said wall, said wall and said container being rotatable relative to each other enabling components of said material to remain substantially at rest relative to said wall during the treatment.

2. The apparatus of claim 1, wherein the shaft of the radial wall is composed of two concentric pipes of which the outer pipe serves as a withdrawal duct and the inner, central pipe serves as a supply duct, said pipes communicating with different sides of the radial wall along the whole of its length.

3. The apparatus of claim 2, wherein the inner pipe has openings disposed longitudinally of the radial wall along a screen forming outlet slots the breadths of which are approximately proportional to the square of the rotational radius.

4. The apparatus of claim 3, wherein the radial wall is provided with radial corrugations having recesses on the supply side of the wall covered by the screen which forms separate radial slots.

5. The apparatus of claim 2, wherein the radial wall is led into the inner, central pipe and on the supply side of the wall between the inner pipe and the outer pipe there is defined an opening, and wherein an axially and radially extending wall seals said opening.

6. The apparatus of claim 2, wherein the two pipes of the shaft are led out of opposite ends of the container.

* * * * *